Nov. 17, 1970

P. H. SHARP 3,541,411

AUTOMATIC PLUGGING CIRCUIT FOR BRAKING AN
ALTERNATING-CURRENT MOTOR

Filed June 23, 1969

INVENTOR
PAUL H. SHARP
BY
Flam and Flam
ATTORNEYS.

Nov. 17, 1970    P. H. SHARP    3,541,411
AUTOMATIC PLUGGING CIRCUIT FOR BRAKING AN
ALTERNATING-CURRENT MOTOR
Filed June 23, 1969    2 Sheets-Sheet 2

INVENTOR
PAUL H. SHARP
BY
*Flam and Flam*
ATTORNEYS.

United States Patent Office 3,541,411
Patented Nov. 17, 1970

---

3,541,411
AUTOMATIC PLUGGING CIRCUIT FOR BRAKING AN ALTERNATING-CURRENT MOTOR
Paul H. Sharp, Sierra Madre, Calif., assignor to Columbia Broadcasting System, Inc., New York, N.Y., a corporation of New York
Filed June 23, 1969, Ser. No. 835,700
Int. Cl. H02p 3/24
U.S. Cl. 318—212
13 Claims

ABSTRACT OF THE DISCLOSURE

An alternating-current motor is controlled by a simple single-pole switch having an ON position and an OFF position. When the switch is in its ON position, full wave alternating current is applied; when the switch is moved to its OFF position, only a half wave of the alternating current is permitted to be applied to the motor. By virtue of the action of a simple control circuit, half wave conduction commences later and later in the half cycle until current is ultimately cut off.

FIELD OF THE INVENTION AND DISCUSSION OF PRIOR ART

This invention relates to a system for quickly braking an alternating-current motor and its load by the well-known technique of applying a direct current to the motor. A simple switching device can accomplish this result. In order to achieve quick stopping, a heavy direct current is used. Such current must be interrupted after the load is brought to a stop since motor windings are ordinarily not designed to tolerate such currents on a steady state basis. The simplest arrangement is to use a simple switch and rely upon the conscious effort of the operator to return the switch to a neutral position. This is not practical in many applications where the motor is part of a system designed to be operated by untrained persons. Typical of such applications are tape transport mechanisms, pulsato rotors for electronic organs, etc.

It has been proposed to use a simple thermal switch to open the direct-current circuit after a time delay. This arrangement, while generally satisfactory, creates certain problems associated with thermal inertia. Thus, the motor must operate long enough to allow cooling which is necessary for the thermal switch to be reset. Also, power is used on a steady state basis when the system is off in order to keep the thermal switch heated.

BRIEF SUMMARY OF THE INVENTION

The primary object of this invention is to provide a simple control circuit for automatically applying braking current to an alternating-current motor, but only for a controlled period of time. In order to accomplish this objective, I provide solid state switching means in series with the motor so arranged as to permit bidirectional conduction under running conditions, but unidirectional conduction in the off condition. Capacitive means are so arranged as to be progressively charged by half wave conduction, and the increasing charge on the capacitive means progressively delays the firing angle of the solid-state switching means until conduction ultimately ceases. When the system is returned to running condition, the system is immediately reset by discharge of the capacitive means. Moreover, no current is drawn on a steady state basis when the system is in the off condition.

BRIEF DESCRIPTION OF THE DRAWINGS

A detailed description of the invention will be made with reference to the accompanying drawings. The description of the invention is of the best presently contemplated modes of carrying out the invention. This description is not to be taken in a limiting sense, but is made merely for the purpose of illustrating the general principles of the invention. Structural and operational characteristics attributed to forms of the invention first described shall also be attributed to forms later described, unless such characteristics are obviously inapplicable or unless specific exception is made.

DETAILED DESCRIPTION

Figure 1:
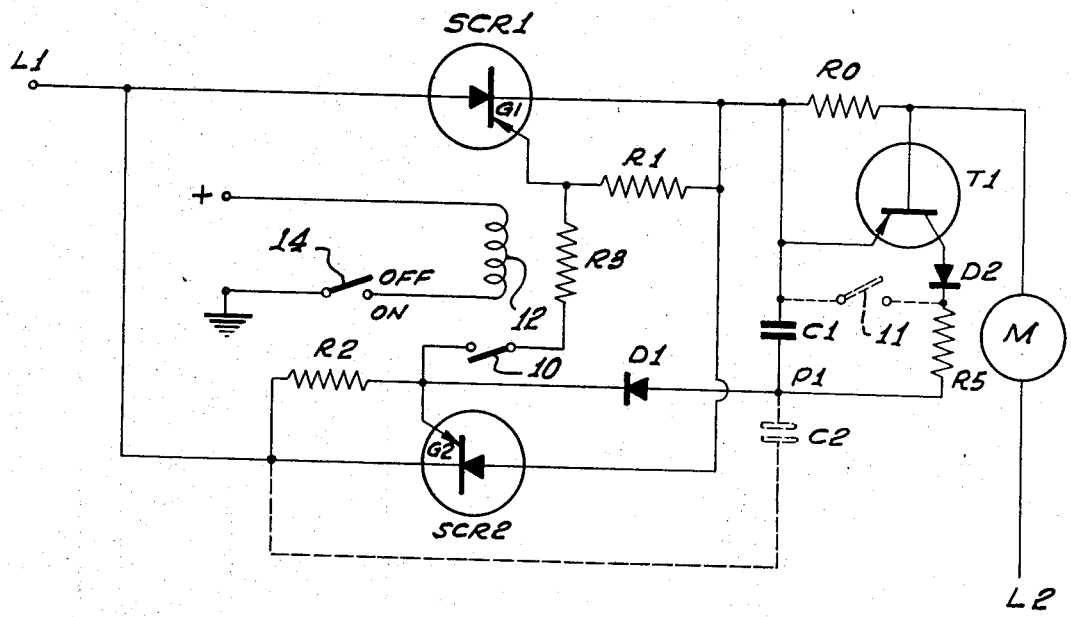
FIG. 1 is a schematic diagram of a speed control system incorporating the present invention.

In FIG. 1, a motor M is shown connected to alternating-current lines L1 and L2. Current to the motor is dependent upon a pair of controlled rectifiers SCR1 and SCR2 connected in back to back relationship. These controlled rectifiers are interposed between one terminal of the motor M and one of the lines L1. When the line L1 is positive, conduction proceeds through SCR1; when the line L1 is negative, conduction proceeds through SCR2. A sensing resistor R0 of very small ohmic value is interposed between the rectifiers and the motor for purposes to be described hereinafter.

The controlled rectifiers have gate circuits so arranged that when the system is on, conduction occurs substantially simultaneously with the existence of forward bias on the controlled rectifiers. The gates G1 and G2 are connected to cathodes of the corresponding rectifiers through resistors R1 and R2 that serve in a conventional manner to stabilize the rectifiers against false triggering. The operating circuit for the gates is provided by a resistor R3 and normally open contacts 10 operated by a relay coil 12. These elements connect the gates G1 and G2 together. When the relay contacts 10 are closed by energizing the coil 12, firing circuits are established. Thus, when the line L1 swings positive, gate current flows from line L1, resistor R2, contacts 10, resistor R3, gate G1 to the cathode of the rectifier SCR1, and the rectifier is immediately triggered. Current then flows through SCR1 to the motor M.

When the line L1 swings negative, gate current flows from line L2, motor M, resistors R1 and R3, contacts 10, gate G2 to the cathode of the rectifier SCR2. The rectifier SCR2 is thus immediately triggered for conduction on the negative half of the cycle.

To turn the system off, current to the relay coil 12 is cut off by operation of manually controlled ON–OFF switch 14. The relay circuit is provided in order to isolate the power circuit from the control circuit and to facilitate remote control. If desired, the contacts 10 could be parts of a manually operable switch. The gate circuits previously traced are both interrupted by opening of contacts 10. However, an alternate circuit is provided for firing one and only one of the controlled rectifiers, in this instance, SCR2. This auxiliary firing circuit is provided by a capacitor C1 and a diode D1. One side of the capacitor C1 is connected to line L2 through resistor R0 and the motor M; the cathode of the diode D1 is connected to the gate G2; the other side of the resistor and the anode of the diode D1 are connected together at a terminal P1. The firing circuit for one half of the cycle can be traced when line L2 is positive: line L2, motor M, resistor R0, capacitor C1, diode D1, gate G2 to the cathode of rectifier SCR2. During the alternate half cycle, there is no firing circuit for gate G1; hence, conduction occurs only during alternate half cycles through SCR2. Direct current through the motor M results in a transfer of mechanical energy to the lines, and the motor M is accordingly braked.

Figure 2:
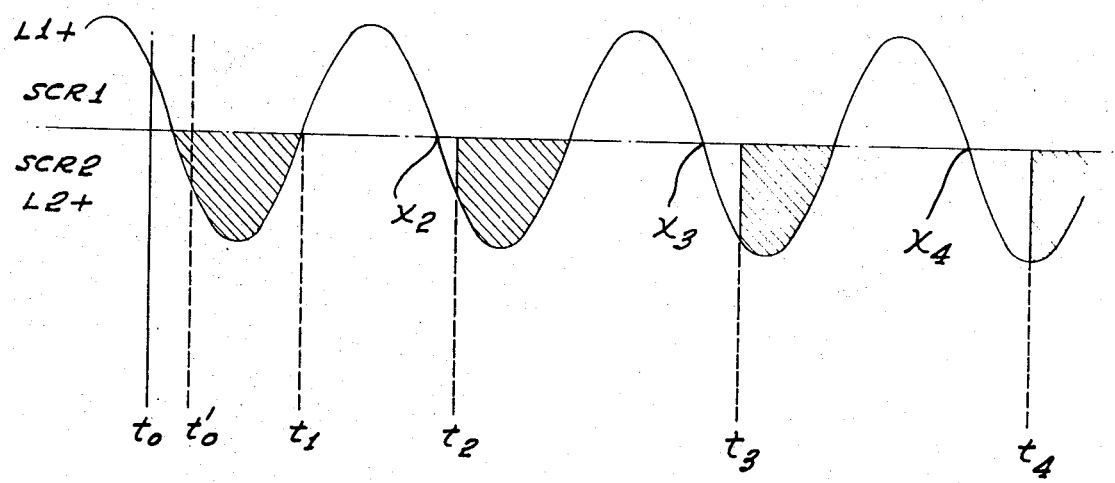
FIG. 2 is a diagram illustrating the current characteristic of the system.

When the system is turned off, current at that instant may be flowing either through SCR1 or SCR2. If it is then flowing through SCR1 (time=$t_0$, FIG. 2) it will continue to do so until the end of the half cycle due to the holding current characteristic of the device SCR1. Thereafter, SCR1 will not be fired. If current was flowing through SCR2 at the instant of opening of contacts 10 (time=$t_0'$), current will not flow through SCR1 at the beginning of the next half cycle (time=$t_1$). Accordingly, the significant change occurs at $t_1$, the beginning of the positive half cycle.

Capacitor C1 progressively delays the firing of SCR2 as shown at $t_2$, $t_3$, $t_4$, etc., until all conduction ceases. The incremental delay (exaggerated in FIG. 2) may be such as to provide cutoff after some hundreds of cycles corresponding to a total elapsed time of ten seconds. This may be varied over a wide range according to the particular application say, from one second to one minute or even more. The way in which the capacitor C1 produces this result may be explained by considering the condition of the circuit at successive half cycles.

When the line L2 swings positive at time $x_2$ charge builds up on the capacitor C1 until at time $t_2$ enough gate current has flowed to trigger SCR2. The charge on capacitor C1 remains since there is no discharge path. This charge may correspond, for example, to one volt. At time $x_3$ when the line L2 again swings positive, no current can begin to flow through the capacitor C1 until the line voltage is at least equal to the residual voltage on the capacitor C1. Accordingly, gate current is delayed and firing takes place at time $t_3$. Again charge has been added to the capacitor C1. Hence, at the time $x_4$ when the line L2 again swings positive, gate current is further delayed in time. Ultimately, conduction ceases when the charge on capacitor C1 results in a voltage across it corresponding to the peak value of the supply voltage. This, of course, depends on the size of the capacitor.

When the system is again turned on by closure of contacts 10, the capacitor C1 is discharged. The discharge circuit is established in response to conduction of SCR1. Thus, when current flows through SCR1 a small positive voltage is developed across the sensing resistor R0. This voltage turns on a transistor T1. Thus, resistor R0 is connected across the base and emitter of transistor T1. The collector of the transistor is connected to a reverse current blocking diode D2, a current limiting resistor R5 to terminal P1. The positive charge on the upper plate of capacitor C1 thus flows through transistor T1, diode D2, resistor R5, to the lower plate of capacitor C1. When the system is off, the discharge circuit is open since the only voltage developed across resistor R0 is negative. This does not turn on the transistor T1. In place of the automatic circuit provided by transistor T1, diode D2, and sensing resistor R0, a manually operative reset switch 11 may be provided. By judicious operation of the switch 11, longer braking time can be achieved by closure during the braking mode. By leaving switch 11 open, braking will occur only once.

The time period can be lengthened by increasing the capacity of capacitor C1. The physical size of this component tends to become objectionable. It has been found that the time period can be lengthened by adding a capacitor C2 between terminal P1 and the line L1. A capacitor so placed has more effect than a capacitor of similar size placed in parallel with capacitor C1. Charge builds up on capacitor C2 as charge builds up on capacitor C1. Thus, the upper plate of capacitor C2 becomes positive relative to its lower plate. There would appear to be a discharge circuit for capacitor C2 through diode D1 and resistor R2. Prior to firing of SCR2, this discharge path is not effective since capacitor C2 is charging under the influence of positive line voltage; upon firing of SCR2, diode D1 becomes reverse biased and hence nonconductive. Capacitor C2 is discharged through diode D1 when the system is turned on.

Figure 3:
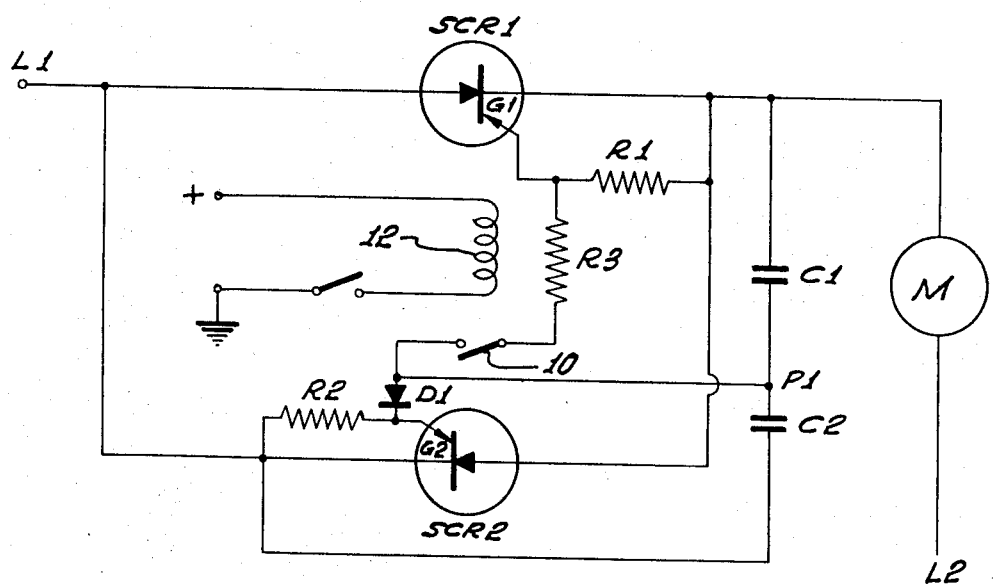

In the form illustrated in FIG. 3, the stabilizing resistor R1 for the controlled rectifier SCR1 is used to provide a discharge path for capacitor C1. This is done by moving contacts 10 to the terminal P1 on the anode side of diode D1, rather than the cathode side. With contacts 10 open, the circuit is the same as in FIG. 1 with contacts open. The discharge circuit is effective only when contacts 10 are closed when the system is turned on. The discharge circuit can be traced through resistors R1, R3 and contacts 10. In this circuit the capacitor C2 is required to provide gate current to SCR1 when the system is on, since diode D1 blocks the current path through R2. In all other respects the operation is the same as in FIG. 1.

With sensitive controlled rectifiers, at 110-volt operation, R1 and R2 may be about 330 ohms; R3 about 10,000 ohms; R5 as small as necessary to develop gate current; R6 large enough to protect transistor T1; C1 and C2 about 0.1 microfarad. The contacts 10 and coil 12 may be elements of a reed relay.

Figure 4:
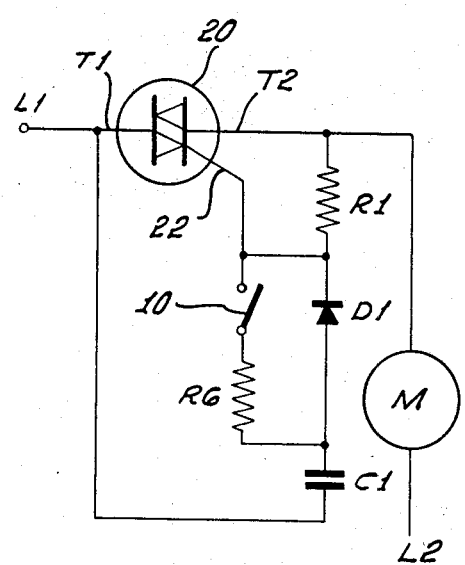
FIGS. 3, 4 and 5, respectively, show second and third embodiments of the present invention.

In the form illustrated in FIG. 4, a triac 20 is provided in place of the controlled rectifiers. The circuit for the motor M can be traced from line L1, one power terminal T1 of the triac, the other power terminal T2 of the triac, motor M and line L2. When the contacts 10 are closed, the triac 20 conducts during both half cycles. The gate lead 22 of the triac is connected to line L1 through contacts 10, resistor R6 and capacitor C1. This circuit is effective to pass gate current whether the line L1 is positive or negative. However, when the contacts 10 are open, a diode D1 is included in the gate circuit; accordingly, gate current can pass only on one half of the cycle. In this particular example, the diode D1 is so connected that gate current flows only when the line L1 is positive. During such half cycles charge builds on the capacitor C1. There is no discharge circuit for the capacitor C1 until and unless contacts 10 are closed. The operation of the circuit is similar to the forms previously described.

Figure 5:
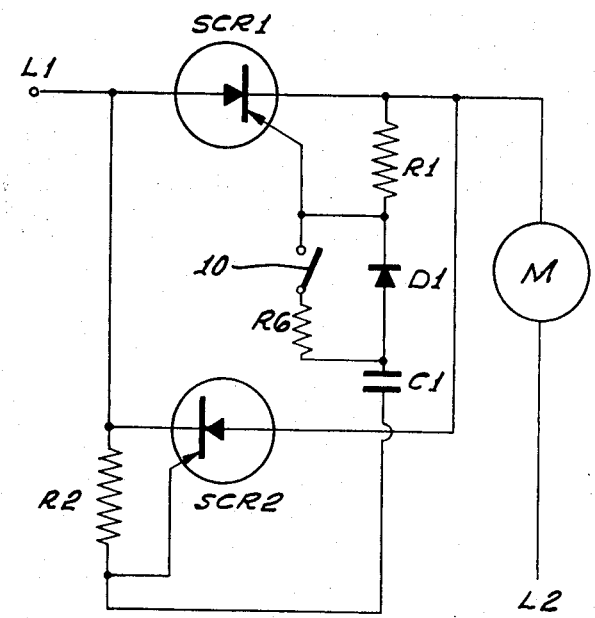

FIG. 5 shows a circuit analogous to FIG. 4, but with a pair of silicon controlled rectifiers substituted for the triac.

We claim:
1. In a speed control system for an alternating-current motor:
   (a) switching means for controlling the flow of alternating current to said motor and having a holding current characteristic whereby, unless repeatedly triggered, conduction ceases at the end of the half cycle of the source;
   (b) a trigger circuit for said switching means;
   (c) means determining an ON mode of operation of said trigger circuit in which said switching means is triggered each half cycle for flow of alternating current to said motor;
   (d) means determining an OFF mode of operation of said trigger circuit in which said switching means is triggered only on alternate half cycles for flow of half wave rectified current to said motor; and
   (e) means operative upon initiation of the OFF mode of operation of said trigger circuit for progressively delaying the time following the start of said alternate half cycles when said switching means is triggered whereby conduction ultimately ceases.

2. The combination as set forth in claim 1 in which said means for progressively delaying the time when said switching means is triggered includes capacitive means progressively charged on alternate half cycles and biasing said trigger circuit for later and later triggering; and means for resetting the capacitor.

3. In a speed control system for an alternating-current motor:
   (a) first controlled rectifier means having a gate;
   (b) second controlled rectifier means having a gate;
   (c) means connecting said controlled rectifier means to said motor to provide alternate conductive paths of current for the motor for alternate half cycles of the source;

(d) a gate circuit for said first controlled rectifier means, including a selectively operable component having an ON mode and an OFF mode respectively for permitting and preventing flow of current to said gate of said first controlled rectifier; said gate circuit, when said component is in its ON mode, being connected to forward bias said first controlled rectifier means at the start of the corresponding half cycle of operation;

(e) a gate circuit for said second controlled rectifier means connected to forward bias said second controlled rectifier means at the start of the corresponding half cycle of operation when said component is in its ON mode; and (f) an auxiliary gate circuit for said second controlled rectifier means including capacitive means in series with said motor serving progressively to bias said trigger circuit for later and later triggering.

4. In a speed control system for an alternating current motor cooperable with alternating current power lines:
(a) a first controlled rectifier means having a cathode, an anode and a gate;
(b) a second controlled rectifier means having a cathode, an anode and a gate;
(c) means connecting said rectifier means in back to back relationship and together in series with said motor;
(d) an impedance network connected across said lines;
(e) a switching device in said network and having at ON state and an OFF state;
(f) means connecting said gates to said network on opposite sides of said switching device whereby said rectifier means are respectively triggered at the start of the corresponding half cycles when said switching device is in its ON state;
(g) an auxiliary triggering circuit for one of said rectifier means comprising in series a resistor connected to the cathode of the other rectifier means and a diode connected to the gate of said one of said rectifier means; and
(h) a capacitor connected between the cathode of the said rectifier means and the junction of said resistor and diode.

5. In a speed control system for an alternating-current motor cooperable with alternating-current power lines:
(a) a first controlled rectifier means having a cathode, an anode and a gate;
(b) a second controlled rectifier means having a cathode, an anode and a gate;
(c) means connecting said rectifier means in back to back relationship and together in series with said motor;
(d) an impedance network connected across said lines;
(e) a switching device in said network and having an ON state and an OFF state;
(f) means connecting said gates to said network on opposite sides of said switching device whereby said rectifier means are respectively triggered at the start of the corresponding half cycles when said switching device is in its ON state; and
(g) an auxiliary triggering circuit for one of said rectifier means comprising in series a capacitor connected to the cathode of the other of said rectifier means and a diode connected to the gate of said one of said rectifier means.

6. The combination as set forth in claim 5 together wth a second capacitor connected between the cathode of the said one of said rectifier means and the junction of said first capacitor and said diode.

7. The combination as set forth in claim 5 together with means operative only when said other controlled rectifier means is conductive for discharging said capacitor.

8. The combination as set forth in claim 5 in which said capacitor has a discharge circuit operative when said switching device is in its ON state.

9. The combination as set forth in claim 6 together with means operative only when said other controlled rectifier means is conductive for discharging said first capacitor.

10. The combination as set forth in claim 9 in which said first capacitor has a discharge circuit operative when said switching device is in its ON state.

11. In a speed control system for an alternating-current motor:
(a) a switching means for controlling the flow of alternating current to said motor and having a holding current characteristic whereby unless repeatedly triggered, conduction ceases at the end of the half cycle of the source;
(b) a trigger circuit for said switching means including rectifying means and selectively operable means for shunting said rectifying means whereby said switching means is operated on both half cycles when said selectively operable means shunts said rectifying means and whereby said switching means is operated on alternate half cycles when said rectifying means is not shunted; and
(c) a capacitor included in the trigger circuit when said rectifying means is not shunted and progressively charged on alternate half cycles whereby said switching means is triggered later and later in the corresponding half cycle, said capacitor being discharged when said rectifying means is shunted.

12. The combination as set forth in claim 11 in which said switching means is a triac having a gate, said trigger circuit including in series, a diode and a capacitor connecting said gate to one terminal of the triac.

13. The combination as set forth in claim 11 in which said switching means comprises a pair of controlled rectifiers in back to back relationship and having gates, said trigger circuit including in series, a capacitor and a diode connecting said gates; there being impedance elements connecting the gates of said controlled rectifiers to their corresponding cathodes.

References Cited
UNITED STATES PATENTS

| | | | |
|---|---|---|---|
| 3,398,343 | 8/1968 | Plumpe | 318—212 |
| 3,408,550 | 10/1968 | Graham | 318—212 |
| 3,421,063 | 1/1969 | Reinke | 318—212 |

ORIS L. RADER, Primary Examiner
K. L. CROSSON, Assistant Examiner

U.S. Cl. X.R.
318—227